(12) United States Patent
Auvray et al.

(10) Patent No.: US 9,164,816 B2
(45) Date of Patent: Oct. 20, 2015

(54) SYSTEM AND METHOD FOR EXCHANGING INFORMATION IN A MULTIMEDIA TERMINAL

(75) Inventors: Vincent Auvray, Tonneville (FR); Guillaume Desfeux, Caen (FR)

(73) Assignee: Orange, Paris (FR)

( * ) Notice: Subject to any disclaimer, the term of this patent is extended or adjusted under 35 U.S.C. 154(b) by 691 days.

(21) Appl. No.: 12/738,387

(22) PCT Filed: Oct. 13, 2008

(86) PCT No.: PCT/FR2008/051856
§ 371 (c)(1),
(2), (4) Date: Apr. 16, 2010

(87) PCT Pub. No.: WO2009/053641
PCT Pub. Date: Apr. 30, 2009

(65) Prior Publication Data
US 2010/0257233 A1    Oct. 7, 2010

(30) Foreign Application Priority Data

Oct. 18, 2007 (FR) ..................................... 07 07300

(51) Int. Cl.
*G06F 15/16* (2006.01)
*G06F 9/54* (2006.01)

(52) U.S. Cl.
CPC .......... *G06F 9/541* (2013.01); *G06F 2209/541* (2013.01)

(58) Field of Classification Search
CPC   G06F 9/541; G06F 13/387; G06F 2212/1004
USPC ........................................................ 709/203
See application file for complete search history.

(56) References Cited

U.S. PATENT DOCUMENTS

| | | | | |
|---|---|---|---|---|
| 5,987,135 | A * | 11/1999 | Johnson et al. | 709/224 |
| 6,609,146 | B1 * | 8/2003 | Slotznick | 709/200 |
| 6,889,260 | B1 * | 5/2005 | Hughes | 709/246 |
| 7,248,852 | B2 * | 7/2007 | Cabrera et al. | 455/403 |
| 2002/0111999 | A1 * | 8/2002 | Andersson | 709/203 |
| 2003/0028363 | A1 * | 2/2003 | Nobili et al. | 704/1 |

FOREIGN PATENT DOCUMENTS

EP    0 974 897 A2    1/2000
EP    1 113 361 A1    7/2001

* cited by examiner

*Primary Examiner* — Esther B Henderson
(74) *Attorney, Agent, or Firm* — Drinker Biddle & Reath LLP

(57) ABSTRACT

A system for data exchange in a multimedia terminal, said terminal comprising native applications (2) executable directly by the terminal and local applications (4) and also remote applications (6) executable through Internet browser software (8). This system comprises a module (18) for detecting the operation of applications (4, 6) that are executable through Internet browser software, a downlink interface (10A) for data exchange between the applications (4, 6) that are executable through Internet browser software and the native applications and an uplink interface (10B) for data exchange between the native applications and the local applications, said detecting module and said downlink and uplink interfaces being adapted for exchanging data.

7 Claims, 2 Drawing Sheets

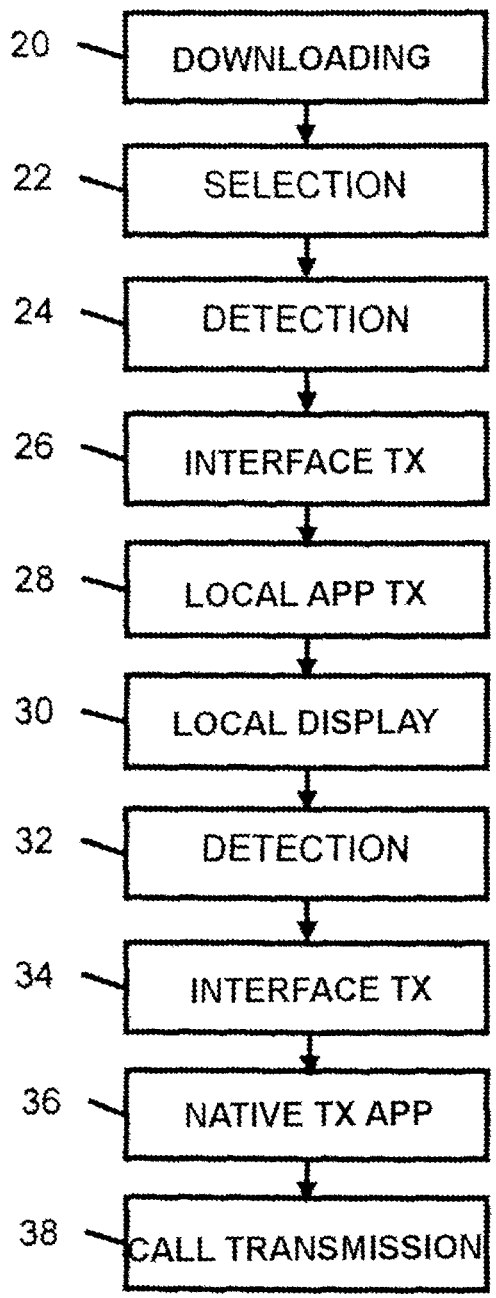

SYSTEM AND METHOD FOR EXCHANGING INFORMATION IN A MULTIMEDIA TERMINAL

CROSS-REFERENCE TO RELATED APPLICATIONS

This application is the U.S. national phase of the International Patent Application No. PCT/FR2008/051856 filed Oct. 13, 2008, which claims the benefit of French Application No. 07 07300 filed Oct. 18, 2007, the entire content of which is incorporated herein by reference.

FIELD OF THE INVENTION

This invention relates to data exchanges between so-called native, local and remote applications in multimedia terminals.

BACKGROUND

Generally speaking, multimedia terminals comprise a certain number of so-called native applications which are associated with the use of the terminal resources. For example, in the case of a telephone terminal, native applications are the network connection, call transmitting and receiving applications as well as applications for screen control or for controlling a user interface, such as a keypad or touch screen.

In addition, one functionality prevalent in the Internet field is the use of applications executed using Internet browser software. JavaScript "plug-in" type applications are examples of applications executed using browser software.

These applications are either local applications or remote applications. The local applications are downloaded and then stored locally in the terminal. The remote applications are stored on a remote server and run on the corresponding Internet page when downloaded. It bears noting that even if these applications are called "remote", the execution thereof is carried out at the terminal. However, they are differentiated from local applications in that they cannot be executed in the absence of a connection to remote equipment, unlike the local applications which can be executed "off-line".

In the field of multimedia terminals, native, local and remote applications are considered to have different execution contexts. For security reasons, the terminals incorporate logical barriers which reduce the permeability between applications in different execution contexts.

Thus, an event corresponding to the implementation of an application in a particular execution context is not relayed in the execution contexts.

For example, a remote application cannot control the screen intensity setting or initiate outbound calling, and a local application cannot communicate with a remote application.

However, an increasing number of terminals today enable access to Internet type resources, and it is advantageous to be capable of easily and directly using data or information related to remote applications via native or local applications, and vice versa.

As a matter of fact, today a user cannot store telephone numbers on an Internet directory and access this Internet directory using a local application or even execute the call using a native application.

SUMMARY

One advantage of this invention is that of enabling greater permeability and improved integration between native, local and remote applications.

To that end, one of the objects of this invention is a data exchange system for a multimedia terminal, said terminal comprising native applications which are directly executable by the terminal, and local as well as remote applications which are executable via Internet browser software, characterized in that the system includes a module for detecting the running of applications executable via Internet browser software, a first data exchange interface between the local applications and the native applications and a second data exchange interface between the native applications and the local applications, said detection module and said first and second interfaces being adapted for exchanging data.

Thus, the data transfers between the detection module and the two interfaces enable information to be used from one field of execution to the other.

The detection module is advantageously adapted to relay information relating to the running of applications executable via Internet browser software to said first interface, said first interface is adapted to relay information relating to the running of remote applications to said second interface and information relating to the running of local applications to native applications, and said second interface is adapted to relay information coming from said first interface to local applications.

In this way, the information resulting from the execution of the remote application is converted into information resulting from the execution of the local application, while at the same time ensuring proper synchronization between the local and native applications.

In one particular embodiment, said first and second interfaces are adapted to convert the information between a first computer language used by said native applications and a second computer language used by said applications executable via Internet software.

In one particular embodiment, the system includes a native notification application adapted to periodically query a remote server and to transmit the information obtained to a native application and/or a local application via said second data exchange interface.

In this way, information coming from a remote server can be used in native and/or local applications of the terminal.

In yet another embodiment, the system includes a native notification application adapted to periodically transmit information relating to the running of native and/or local applications to a remote server, and at least one remote application of the terminal is adapted to obtain this information from the remote server.

Such an embodiment enables information coming from local and/or native applications to be used in a remote application, i.e., to convert information coming from the local and/or native applications into information coming from the remote applications.

In addition, another object of the invention is a method of exchanging data in a multimedia terminal between native applications which are directly executable by the terminal and local applications, as well as remote ones executable via Internet browser software, characterized in that it includes transmission of information relating to the running of a remote application to a first data exchange interface between the local applications and the native applications, transmission of this information to a second data exchange interface between the native applications and the local applications, transmission of this information by said second interface to a local application, execution of the local application using said information, transmission of information relating to the running of said local application to said first interface and transmission of said information to a native application by said first interface.

In one alternative, the method further includes detection of the running of applications executable via Internet browser software with a view to transmitting information relating to the running of remote applications and to the execution of local applications to said first interface.

In yet another alternative of the method, said transmissions of information between the native applications and the applications executable via browser software comprise conversions between a first computer language used by the native applications and a second computer language used by the applications executable via browser software.

In another alternative, the method further comprises issuance, by a local application, of a request to query a remote server, obtainment of feedback information, and transmission of this information to a native application and/or to a local application via the second interface.

Finally, in another alternative, the method further comprises transmission of information relating to the running of native and/or local applications to a remote server by a native application, and obtainment of this information by a remote application.

Another object of the invention is a computer program comprising code instructions which, when same are executed by a microprocessor or a microcontroller of a multimedia terminal, involve an exchange of data between local applications as well as remote ones and native applications of the terminal, and an exchange of data between native applications of the terminal and local applications as well as remote ones, according to the previously described method.

BRIEF DESCRIPTION OF THE DRAWINGS

Other features and advantages of this invention will become apparent from the description provided hereinbelow for non-limiting purposes, and with reference to the appended drawings, in which:

FIG. 2 is a flowchart of a particular method of using the invention.

DETAILED DESCRIPTION

Figure 1:
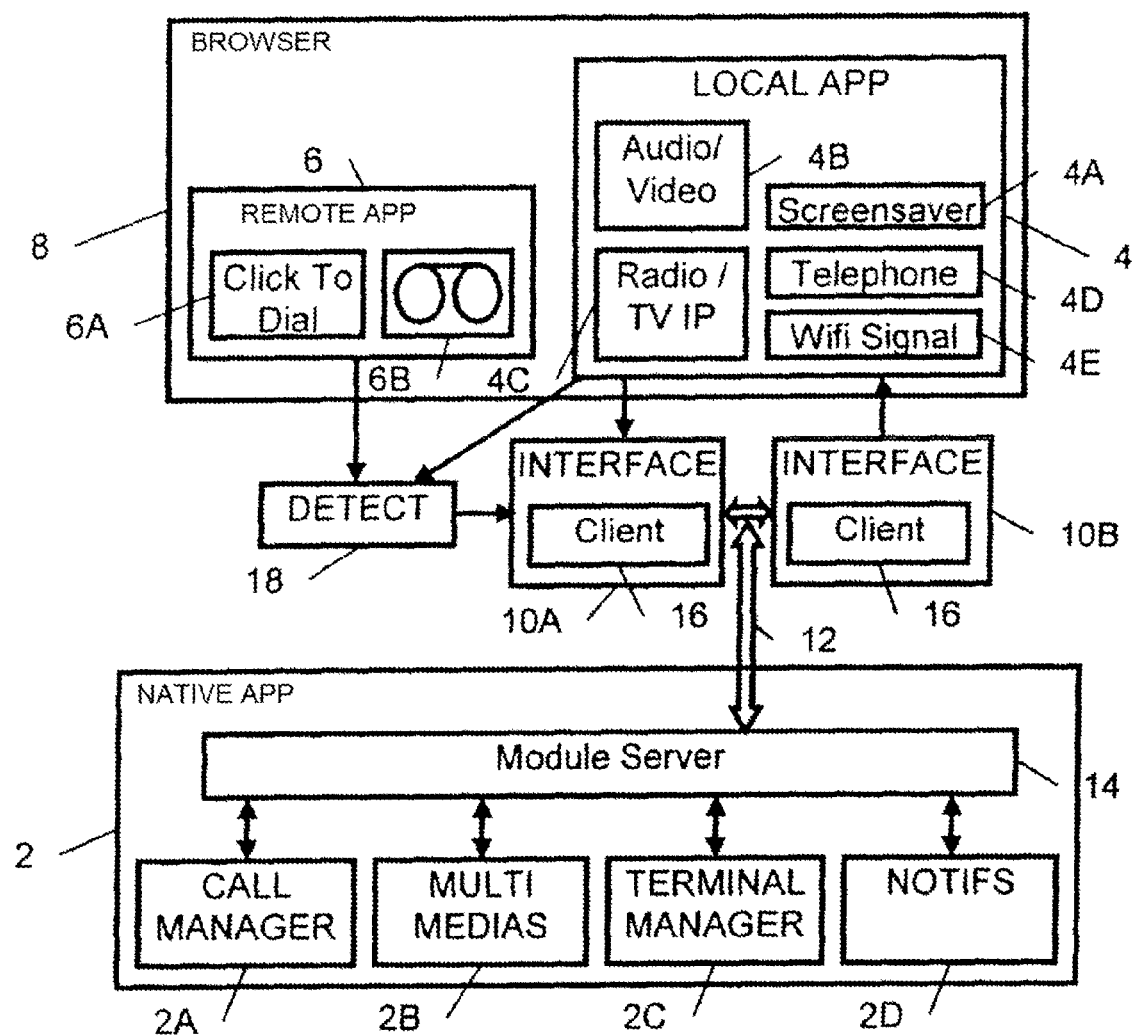
FIG. 1 is a block diagram of the software architecture of the invention.

FIG. 1 shows the software architecture of a terminal according to the invention. This software architecture is divided into three parts with native applications 2, local applications 4 and remote applications 6. The local 4 and remote 6 applications are executed in Internet browser software 8.

The native applications, likewise called binary, are directly executable by the multimedia terminal. This is understood to mean that these applications correspond to source codes stored in storage devices of the terminal, and that they are executed directly by the microprocessor. In the example, these applications run in the computer language called C++.

In the example, the native applications are grouped in four categories, 2A, 2B, 2C and 2D, respectively. Category 2A corresponds to the telephone applications, e.g., such as call management (Call Manager) and call control (Click-to-Dial). Category 2B corresponds to the multimedia applications, and, in particular, to the screen saver, local audio/video management (A/V local) and streaming audio/video management (A/V streaming) applications. Category 2C corresponds to the applications relating to management of the terminal and, in particular, to software updates, quick start and wireless network connections. Category 2D corresponds to the applications associated with exchanges of notifications with remote servers such as messaging servers.

These categories as well as the applications listed above are conventional in existing multimedia terminals.

Additionally, the local applications 6 include JavaScript type applications which, in the example, enable the execution of screen savers 4A, the execution of audio/video functions 4B, the reception 4C of radio or television streams according to the IP protocol, the execution of telephone functions 4D or else the execution of wireless network connection functions 4E.

Furthermore, the software architecture includes the remote applications 6A and 6B which, via an Internet page, enable a telephone number to be dialed and access to a messaging system, respectively.

In the embodiment described, the software architecture further includes two interfaces 10A and 10B. Interface 10A enables so-called downward communication between the applications executed in the Internet browser 8 and the applications executed in the terminal. More precisely, in the embodiment described, this interface 10A enables information to be relayed between the local applications 4 and the native applications 2. In the example, this interface 10A is adapted to convert JavaScript type messages into C++ language messages.

Interface 10B enables so-called upward communication between the native applications 2 and the local applications 4. In the example, this interface converts the information transmitted in C++ language into JavaScript language.

In addition, the interfaces 10A and 10B are adapted to communicate directly between each other. In particular, interface 10A is adapted to relay information coming from remote applications to interface 10B. The interfaces 10A and 10B likewise communicate with the native applications 2 by using a software bus 12. In the example, this bus includes a server module 14 at the native application level and a client module 16 in each interface.

The use of direct communication between the interfaces 10A and 10B enables performance levels to be enhanced and to obtain faster information exchanges, and for video information in particular.

Finally, the software architecture includes a module 18 for detecting events resulting from the implementation of applications that are executable via Internet browser software. This detection module 18 relays information relating to the running of local 4 and remote 6 applications to interface 10A.

An example of operating within the framework of access to a remote directory containing telephone numbers will now be described with reference to FIG. 2.

A user connects to a remote server and access a page stored on the Internet using their terminal and conventional Internet applications.

This page is downloaded during step 20. The page contains a remote application which enables access to the data base located on the remote server comprising the telephone numbers. This page likewise comprises the remote application 6A relating to the transmission of a call.

During step 22, the user selects a contact in the display window of the address book and initiates the call, e.g., by validating a corresponding icon. The JavaScript command contained in the call icon is executed by the browser software.

The execution of this function 6A in the browser is detected by the module 18 during step 24. During step 26, the information relating to detected event is transmitted to interface 10A, which relays same to interface 10B. In this way, the message transmitted by the remote application 6A is recovered as well as the associated parameters, including the telephone number.

Next, interface 10B orders the local video application 4B on the Internet page during step 28. More precisely, a command is issued by interface 10B and contains a JavaScript instruction which is executed by the local video application 4B. This enables feedback information to be displayed to the user, signifying that the call is in progress during step 30.

The execution of this JavaScript command by the local application 4B is detected again by the module 18 during step 32. This information is transmitted to interface 10A during step 34, and then relayed by interface 10A to the native applications during step 36.

The transmission of the information to the native application 2A involves the making of a call during step 38. The telephone number to be dialed was transmitted with the message as a parameter.

In this way, owing to the correspondence between the commands issued by the interfaces, the information from one field of execution is used in another. More precisely, the information coming from running the remote application is converted into information coming from running the local application, so as to be relayed to the native applications.

In addition, in the example described with reference to FIG. 1, the software architecture likewise includes native notification software 2D. This application manages the exchanges of information between one or more remote servers and the terminal.

For example, this notification application periodically queries a remote server, such as a voice messaging or electronic messaging server. In return, the application receives status information which is pulled up by the user. To that end, the status information is transmitted to interface 10B. The information is then transmitted to a local application, e.g., such as a display application for a status indicator of the messaging system. Alternatively, this information is transmitted directly to another native application.

Furthermore, the notification application 2D likewise transmits information relating to the running of local and/or native applications to a remote server. For example, this is log information indicating the calls made, the calls received or else the missed calls. This information coming from native or local applications is next accessible to remote applications 6. In this way, information coming from native and/or local applications is converted into information coming from remote applications. This information becomes re-usable at the terminal via the data exchange mechanism described with reference to FIG. 2.

Of course, other features and alternatives can be anticipated. In particular, computer languages other than C++ and JavaScript can be used.

Furthermore, certain software modules can be combined to fulfill the same functions within a single computer program. In particular, the interfaces for the upward and downward communications can be combined in a single software as well as the downward interface and the detection module.

In another embodiment, the execution of a local application automatically initiates the transmission of information to a native application via interface 10A, but without requiring the use of the detection module. For example, the message transmitted to the local application by the upward interface includes an instruction which initiates this transmission.

In yet another alternative, the information converted by the interfaces 10A and 10B simultaneously initiates the transmission of messages to the local and native applications. Such an embodiment is particularly useful when the local and native applications can be implemented separately.

It is likewise possible to use the communication bus for the exchanges between the interfaces.

The invention claimed is:

1. A data exchange system for a multimedia terminal, said terminal comprising native applications which are directly executable by the terminal, and local as well as remote applications which are executable via Internet browser software, said system comprising:
    a microcontroller configured to detect the running of applications executable via Internet browser software;
    a first data exchange interface between the local applications and the native applications; and
    a second data exchange interface between the native applications and the local applications;
wherein
said microcontroller and said first and second interfaces being adapted to transmit information relating to the running of applications executable via browser software to the local applications and to transmit information relating to the running of the local applications to the native applications;
said system further comprising:
    a native notification application adapted to query a remote server and to transmit the information obtained to at least one of: a) a native application, and b) a local application, via said second data exchange interface; and
    a native notification application adapted to transmit information relating to the running of at least one of native and local applications to a remote server;
wherein
at least one remote application of the terminal is adapted to obtain this information from the remote server.

2. The system of claim 1, wherein the microcontroller is adapted to relay information relating to the running of applications executable via Internet browser software to said first interface, said first interface is adapted to relay information relating to the running of remote applications to said second interface and information relating to the running of local applications native applications, and said second interface is adapted to relay information coming from said first interface to local applications.

3. The system as claimed in claim 1, wherein said first and second interfaces are adapted to convert the information between a first computer language (C++) used by said native applications and a second computer language (JavaScript) used by said applications executable via Internet software.

4. A method of exchanging data in a multimedia terminal between native applications which are directly executable by the terminal and local applications, as well as remote ones executable via Internet browser software, said method comprising:
    detecting the running of a remote application;
    transmitting information relating to the running of the remote application to a first data exchange interface between the local applications and the native applications;
    transmitting this information to a second data exchange interface between the native applications and the local applications;
    transmitting this information by said second interface to a local application;
    executing the local application using said information;
    transmitting information relating to the running of said local application to said first interface;
    transmitting said information to a native application by said first interface;

issuing, by a native application, a request to query a remote server;

obtaining feedback information;

transmitting the obtained feedback information to at least one of a native application and a local application via the second interface;

transmitting, to a remote server via a native application, information relating to the running of at least one of native and local applications; and obtaining this native and local application running information by a remote application.

5. The method of claim 4 further comprising detection of the running of applications executable via Internet browser software with a view to transmitting information relating to the running of remote applications and to the execution of local applications to said first interface.

6. The method as claimed in claim 4, wherein said transmissions of information between the native applications and the applications executable via browser software comprise conversions between a first computer language used by the native applications and a second computer language used by the applications executable via browser software.

7. A non-transitory computer-readable storage medium storing computer program instructions that, when executed, cause a machine to at least carry out the method of claim 4.

* * * * *